Figure 1:
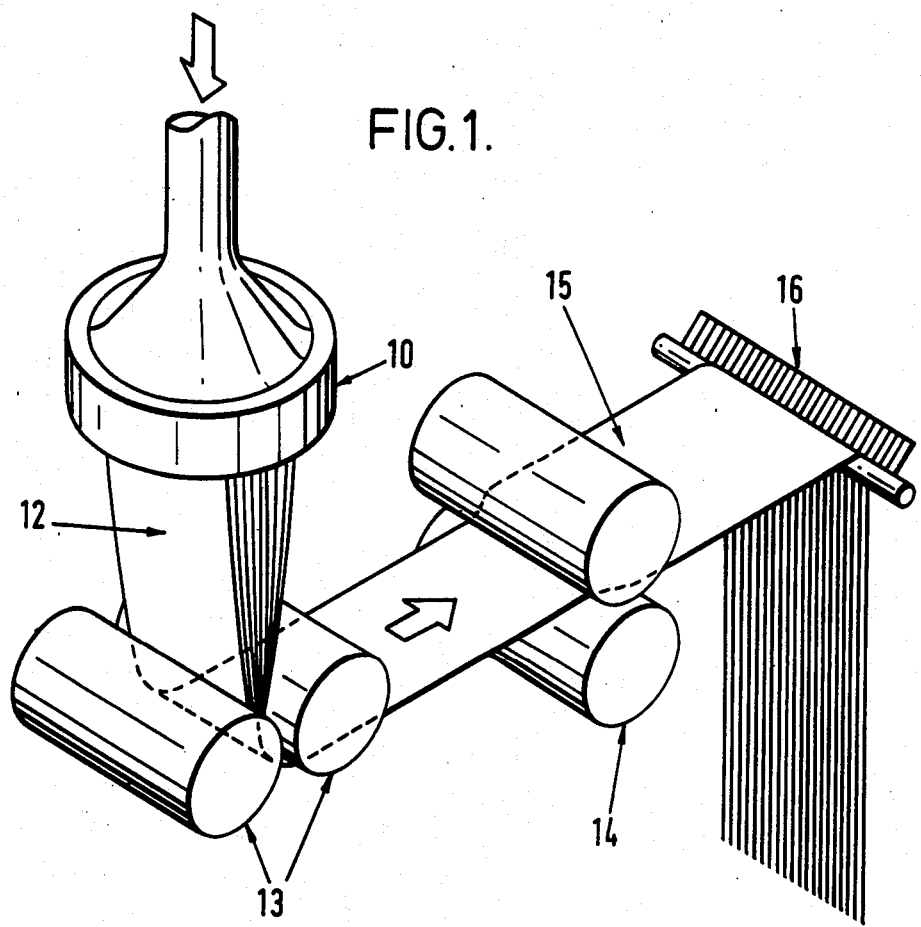

United States Patent [19]

Hsu

[11] Patent Number: 4,675,199
[45] Date of Patent: Jun. 23, 1987

[54] PRODUCTION OF PASTA

[75] Inventor: Jau Y. Hsu, Brookfield, Conn.

[73] Assignee: Nestec S.A., Vevey, Switzerland

[21] Appl. No.: 739,374

[22] Filed: May 30, 1985

[51] Int. Cl.⁴ .............................................. A21L 1/16
[52] U.S. Cl. .................................. 426/557; 425/325; 426/502; 426/516
[58] Field of Search ............... 426/557, 502, 503, 516, 426/517, 518; 425/325, 464

[56] References Cited

U.S. PATENT DOCUMENTS

| 3,318,707 | 5/1967 | Ernst | 426/557 |
| 4,004,035 | 1/1977 | Hirzel et al. | 426/502 |
| 4,244,974 | 1/1981 | Minami et al. | 426/557 |
| 4,290,989 | 9/1981 | Topor et al. | 425/464 |

FOREIGN PATENT DOCUMENTS 53-24497 7/1978 Japan ................................. 426/557

Primary Examiner—George Yeung
Attorney, Agent, or Firm—Vogt & O'Donnell

[57] ABSTRACT

A process for the production of pasta characterized in that flour is mixed with from 15% to 33% by weight of water based on the weight of flour and water to form a dough, the dough is extruded through a pasta die provided with at least three superimposed nozzles for forming dough sheets, and the extruded, superimposed dough sheets are compressed into one dough sheet which is then cut to form the desired pasta shape.

12 Claims, 2 Drawing Figures

PRODUCTION OF PASTA

The present invention relates to a process for the production of pasta.

Basically there are two commercial processes for the production of pasta:

(1) The dough kneading/sheeting process which involves kneading flour with water into dough, rolling into a dough sheet, and then passing the dough sheet through a slitter and cutter to form pasta shapes e.g. noodle, linguine. To obtain a good quality pasta from this process, the dough sheet is usually folded double many times and passed through the rollers to flatten the folded dough sheet: the more laminations formed, the better the pasta quality.

(2) The dough extruding process which involves mixing the flour with water in an amount less than in the dough kneading/sheeting process and extruding the mixture through a pasta die to produce the pastas in a large variety of shapes.

The advantages of the dough kneading/sheeting process are mainly due to its laminated structure which:

(a) imparts a springy elastic texture leading to good eating qualities similar to those of home-made pasta;

(b) enables the pasta to be expanded uniformly at a high drying temperature or high temperature frying conditions commonly used nowadays in the preparation of instant pasta.

The advantages of the dough extruding process when compared with the dough kneading/sheeting process are as follows:

(a) Firmer texture and smoother surface which is produced because the dough mixture is passed through a narrow die under pressure to give an extruded pasta which is very uniform and compact;

(b) a larger variety of shapes can be produced;

(c) it is more efficient, simpler and less time-consuming and it can be run continuously with minimum attention;

(d) the dough that is extruded has a lower water content and, therefore, less time is required to dry the pasta.

The disadvantages of the dough extruding process when compared with the dough kneading/sheeting process are firstly, that the pastas lack the laminated structure and consequently the desirable eating qualities and secondly, because of the high pressure and intense heat applied in the extruding process, some speciality pastas such as spinach pasta usually have a dense dark green colour which is not as bright and appealing as the spinach pasta produced by the dough kneading/sheeting process.

The ideal pasta would possess the advantages of pastas produced by both these processes and in order to combine the advantages of both these processes, we have developed an extrusion/compression pasta process which can produce a laminated pasta with good eating qualities and which is more efficient and less time-consuming than the conventional dough kneading/sheeting process.

Accordingly, the present invention provides a process for the production of pasta characterised in, that flour is mixed with from 15% to 33% by weight of water based on the weight of flour and water to form as dough, the dough is extruded through a pasta die provided with at least three superimposed nozzles for forming dough sheets, and the extruded, superimposed dough sheets are compressed into one dough sheet which is then cut to form the desired pasta shape.

The process of this invention is suitable for the production of all kinds of pastas, and the flour used may be, for example, Semolina wheat, Durum wheat, whole wheat flour, corn flour, pre-gelatinized corn flour, rice flour, waxy rice flour, pre-cooked rice flour, potato flour, pre-cooked potato flour (potato flake), lentil flour, pea flour, soy flour, farina, white and red bean flours (kidney and pinto bean), Mung bean flour, corn starch, wheat starch, rice starch, potato starch, pea starch etc.

If desired, other materials conventionally used in making pastas may be added to the flour, for example, protein materials, gums or surfactants. The protein material may be present in an amount up to 10% by weight based on the weight of the flour and examples of protein materials are egg products such as egg white, whole egg or egg yolk, wheat gluten and soy protein isolate. The gum material may be present in an amount up to 5% by weight based on the weight of flour and examples of gums are alginate gums such as propylene glycol alginate, sodium alginate and potassium alginate. The surfactant may be present in an amount up to 5% by weight based on the weight of the flour and an example of a surfactant is glyceryl monostearate.

In addition, vegetable materials such as spinach, carrot or tomato may be added to the flour, for instance, in an amount up to 5% by weight based on the weight of the flour. These vegetables may be fresh, dehydrated or frozen. The amount of water mixed with the flour and any other ingredients present is conveniently from 17.5% to 30% and preferably from 20% to 28% by weight based on the weight of the flour and water. The optimum amount of water depends on the type of flour. For example, for fine Durum wheat, the amount of water is preferably from 24% to 28% by weight while for coarse Semolina wheat the amount of water is preferably from 20% to 24% by weight based on the weight of the flour and water.

The flour and water and any other ingredients present may be mixed into the dough by using any conventional mixer which can ensure complete mixing of flour and water leaving substantially no flour unmixed, for instance, a Hobart mixer or the mixing compartment attached to most pasta extruders.

Each of the superimposed nozzles in the pasta die has a thickness from about 0.2 mm to 2.5 mm preferably from 0.25 mm to 2.0 mm, and a breadth usually from about 5 cm to 30 cm. The length of the nozzle can vary but is usually about 30 cm long. The number of nozzles may vary but generally not more than 20 are necessary: a die containing from 5 to 15 nozzles is especially advantageous. The extruded superimposed dough sheets are advantageously compressed into a single sheet by passing between one or more pairs of rollers. Where there are more than one pair of rollers, the gap between the rollers of each pair becomes smaller for each succeeding pair so that the dough sheets are compressed gradually to ensure a smooth surface. Preferably, the last roller should be able to close to give a gap having a width of from about 0.25 mm to 2 mm.

The single compressed dough sheet is then conveniently cut by passing through a slitter and cutter to give pieces of the desired size and shape. The pieces may afterwards be dried, for example, in a humid atmosphere, at a temperature from 40° C. to 60° C. for a period of from 1 to 10 hours.

The extruded and compressed pasta produced by this process can be used as fresh pasta, frozen pasta, cooked/refrigerated pasta, cooked/frozen pasta or dehydrated pasta if it is dried.

The process of this invention can be used to make instant pastas. In one method, the extruded and compressed dough sheet is gelatinised by steaming or boiling, pre-dried to a moisture content of from 20% to 30%, for example, by microwave heating, infrared heating or hot air, cut into a pasta shape and finally dried under high temperature/short time conditions, for instance at a temperature from 200° C. to 300° C. for a period of from 1 to 2 minutes. In another method, the extruded and compressed dough sheet is cut into pasta shapes and then steamed and fried. By both of these methods, an instant pasta is formed which requires only from 1 to 5 minutes rehydration with hot water.

Figure 2:
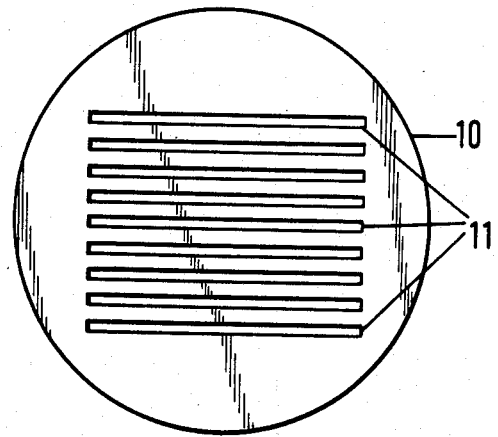

The invention is further illustrated by way of example with reference to the following drawings in which FIG. 1 is a diagrammatic perspective view of an apparatus suitable for forming the pasta from the dough and FIG. 2 is a cross-section through the pasta die.

Referring to the drawings, a dough is fed into the pasta die 10 provided with nine superimposed nozzles 11 and is extruded into nine superimposed dough sheets 12 each having a thickness of 1.25 mm. These sheets pass between a pair of rollers 13 and a pair of rollers 14, where they are compressed to one sheet 15 having a thickness of 0.94 mm which then passes through the slitter 16 to form pasta strips 5 mm wide. A cutter (not shown) cuts the strips into pieces 5 cm long.

The following Examples further illustrate the present invention. Parts and percentages are given by weight.

EXAMPLE 1

94.5 parts of Durum wheat flour were preblended with 5.5 parts of whole egg powder, then added to 35 parts water gradually and mixed for 15 minutes. The dough mixture was extruded in a regular pasta extruder into six superimposed dough sheets each of 1.25 mm thickness, which were then rolled and compressed to one sheet of 0.94 mm thickness, and afterwards slit and cut into noodles 5 mm wide and 5 cm long. The noodles were dried in a pasta drier at 80-85% humidity for 8 hours at 50° C. after which the final moisture content was 9-11% and the dry pasta's thickness was 0.91 mm. The noodles were firm and springy.

To evaluate the water absorption and texture of these noodles the following tests were conducted.

Test I

Water absorption 50 g of noodles were boiled for 12 minutes in 1 liter of boiling water and then the noodles were drained and weighed. The water absorption was calculated by substracting 50 g from the total cooked drained weight.

Cooked firmness 100 g of cooked noodle from the above water absorption test was weighed out and the peak force required to shear the noodle in an Instron Universal Testing Instrument was recorded using a Kramer shear test attachment.

Test II

Water absorption 50 g of noodles were boiled for 12 minutes in 1 liter of boiling water and held in water for 1 hour before being weighed.

Cooked firmness Same procedure as for Test I but on 100 g of noodles from the water absorption Test II.

The results of these tests on the noodles were as follows:

|  | Water absorption | Cooked firmness |
| --- | --- | --- |
| Test I | 110 g | 17 kg |
| Test II | 167 g | 12.5 kg |

COMPARATIVE EXAMPLE A

The same procedure as that described in Example 1 was followed except that the dough mixture was directly extruded through a noodle die to form a ribbon shaped noodle of the same dimensions i.e. 0.94 mm thickness 5 mm width and 5 cm length. The noodles were softer and less springy than those prepared by the process of Example 1. The water absorption and texture were evaluated by the same tests as in Example 1 and the results were as follows:

|  | Water absorption | Cooked firmness |
| --- | --- | --- |
| Test I | 120 g | 12 kg |
| Test II | 203 g | 8 kg |

These results demonstrate that the texture and water absorption are poorer than those of the noodles of Example 1.

EXAMPLES 2 AND 3

Procedures similar to that described in Example 1 were followed except that the dough mixture was extruded into nine superimposed dough sheets in Example 2 and into twelve superimposed dough sheets in Example 3, the dimensions of the dough sheets, compressed noodles and dried noodles being exactly the same as in Example 1. The noodles were firm and springy.

COMPARATIVE EXAMPLE B 94.5 parts Durum wheat flour were preblended with 5.5 parts of whole egg powder, added to 50 parts water, then mixed and kneaded into a dough. By following a procedure similar to that used for making home-made pasta, the dough was kneaded and the dough sheets were overlapped many times before rolling to final dough sheet thickness of 0.96 mm. The sheet was then cut into noodles 5 mm wide and 5 cm long.

The noodles were dried in a pasta drier at 80-85% humidity for 8 hours at 50° C. after which the final moisture content was 9-11% and the dry noodle thickness was 0.91 mm. The noodles were just as firm and springy as those prepared by the processes of Examples 1 to 3.

The water absorption and texture were evaluated by Test I as in Example 1 and the following results show that these qualities are substantially similar to those of the noodles of Examples 1 to 3.

| Example | Water absorption | Cooked firmness |
| --- | --- | --- |
| 1 | 110 g | 17 kg |
| 2 | 107 g | 19 kg |
| 3 | 107 g | 19.5 kg |
| B | 110 g | 18 kg |

EXAMPLE 4

A similar procedure to that described in Example 1 was followed except that 91.5 parts of Durum wheat flour were preblended with 5.5 parts whole egg powder and 3 parts spinach powder instead of just Durum wheat flour and whole egg powder. The noodle was firm and springy and had a bright green colour.

By carrying out Test I as in Example 1 the water absorption was found to be 102 g and the cooked firmness was 17 kg.

COMPARATIVE EXAMPLE C

A similar procedure to that described in Example 4 was followed except that the dough mixture was directly extruded through a noodle die to form a ribbon shaped noodle of the same dimensions. The noodles were softer and less springy than those prepared by the process of Example 4.

The water absorption and texture were evaluated by Test I as in Example 1 and the following results show that these qualities are inferior to those of the noodles of Example 4.

| Example | Water absorption | Cooked firmness |
|---------|------------------|-----------------|
| 4       | 102 g            | 17 kg           |
| C       | 116 g            | 11 kg           |

The noodles of Comparative Example C and Example 4 were evaluated for their green colour and the measurement results obtained by a Hunter Colorimeter are as follows:

| | Hunter Colorimeter's Reading | | | |
|---------|------|-------|-------|--------------|
| Example | L    | a     | b     | Colour       |
| 4       | 46   | −5.88 | 17.68 | Bright green |
| C       | 41.7 | −3.63 | 11.92 | Dark green   |

These results show that the pasta prepared by a regular extrusion process has a dense, dark green colour which is not as bright and appealing as the pasta prepared by the process of Example 4 of the present invention.

EXAMPLE 5

100 parts Durum wheat flour were mixed with 35 parts water for 15 minutes, then extruded into 9 dough sheets and compressed into one sheet of 0.65 mm thickness and 30 cm length. The dough sheet was boiled for 2 minutes, then pre-dried in a microwave oven (1.5 kw) to a moisture content of 25–28%. The partially dried dough sheet was then cut into noodles 2.5 mm wide and 5 cm long and dried at 250° C. for 1 minute. The instant noodle prepared from this process can be rehydrated in hot water within 3 minutes and the noodle surface is smooth unlike the rough, dense surface produced from a dough sheet without lamination.

EXAMPLE 6

100 parts Durum wheat flour were mixed with 35 parts water for 15 minutes, then extruded into 9 dough sheets and compressed into one sheet of 0.65 mm thickness and 30 cm length. The dough sheet was then cut into noodles 2.5 mm wide and 5 cm long, then steamed (20 psig) for 7 minutes and afterwards fried at 130° C. for 30 seconds. The fried noodle can be rehydrated in hot water within 3 minutes and the noodle surface is smooth unlike the rough, uneven surface produced from a dough sheet without lamination.

I claim:

1. A process for the production of pasta comprising mixing flour with from 15% to 33% by weight of water based on the weight of flour and water to form a dough, extruding the dough through a pasta die provided with at least three superimposed nozzles for forming dough sheets, compressing the extruded, superimposed dough sheets into one dough sheet and then cutting the compressed dough sheet to form pieces having a pasta shape.

2. A process according to claim 1 further comprising adding materials selected from the group consisting of protein materials, gums and surfactants to the flour that is mixed with the water.

3. A process according to claim 1 wherein the amount of water mixed with the flour is from 20% to 28% by weight based on the weight of the flour and water.

4. A process according to claim 1 wherein each of the superimposed nozzles in the pasta die has a thickness of from about 0.2 mm to 2.5 mm.

5. A process according to claim 1 wherein each of the superimposed nozzles in the pasta die has a breadth of from about 5 cm to 30 cm.

6. A process according to claim 1 wherein the extruded superimposed dough sheets are compressed into a single sheet by passing the sheets between a pair of rollers able to close to give a gap having a width of from about 0.25 mm to 2 mm.

7. A process according to claim 1 wherein compressed dough sheet is cut by passing the sheet through a slitter and cutter.

8. A process according to claim 1 wherein the cut pasta pieces are dried.

9. A process according to claim 1 further comprising gelatinising the extruded and compressed dough sheet by steaming or boiling, pre-drying the gelatinised dough sheet to a moisture content of from 20% to 30%, then cutting the pre-dried sheet into the pasta shape and then drying the cut pasta pieces at a temperature and for a time such that an instant pasta is produced.

10. A process according to claim 1 further comprising steaming and frying the cut pasta pieces.

11. A process according to claim 9 wherein the pasta is finally dried at a temperature from 200° to 300° for a period of from 1 to 2 minutes.

12. A process for the production of pasta comprising extruding a dough through a die having at least three nozzles to form dough sheets such that the extruded dough sheets are superimposed, compressing the superimposed dough sheets to form a compressed sheet and then cutting the compressed sheet into pieces having pasta shapes.

* * * * *

UNITED STATES PATENT AND TRADEMARK OFFICE
CERTIFICATE OF CORRECTION

PATENT NO. : 4,675,199
DATED : June 23, 1987
INVENTOR(S) : Jau Y. Hsu

It is certified that error appears in the above-identified patent and that said Letters Patent is hereby corrected as shown below:

Claim 11, column 6, line 53, "200° to 300°" should be -- 200°C to 300°C --.

Signed and Sealed this

Thirteenth Day of October, 1987

Attest:

DONALD J. QUIGG

Attesting Officer

Commissioner of Patents and Trademarks